US012222618B2

(12) United States Patent
Um et al.

(10) Patent No.: US 12,222,618 B2
(45) Date of Patent: Feb. 11, 2025

(54) LIQUID CRYSTAL DISPLAY PANEL, DRIVING METHOD THEREOF, AND DISPLAY DEVICE (71) Applicant: TCL CHINA STAR OPTOELECTRONICS TECHNOLOGY CO., LTD., Guangdong (CN)

(72) Inventors: Yoonsung Um, Guangdong (CN); Ji Li, Guangdong (CN); Lixia Li, Guangdong (CN); Yingchun Zhao, Guangdong (CN); Qi Zhang, Guangdong (CN); Fen Long, Guangdong (CN); Ce Liang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/620,734
(22) PCT Filed: Dec. 9, 2021
(86) PCT No.: PCT/CN2021/136787
§ 371 (c)(1),
(2) Date: Dec. 19, 2021
(87) PCT Pub. No.: WO2023/097739
PCT Pub. Date: Jun. 8, 2023

(65) Prior Publication Data
US 2024/0027857 A1  Jan. 25, 2024

(30) Foreign Application Priority Data
Nov. 30, 2021 (CN) .......................... 202111442198.5

(51) Int. Cl.
G09G 3/36 (2006.01)
G02F 1/1362 (2006.01)
G09G 3/20 (2006.01)

(52) U.S. Cl.
CPC ...... G02F 1/136286 (2013.01); G02F 1/1362 (2013.01); G09G 3/3607 (2013.01);
(Continued)

(58) Field of Classification Search
CPC ............ G02F 1/136286; G09G 3/3607; G09G 3/3666; G09G 2300/0426;
(Continued)

(56) References Cited

U.S. PATENT DOCUMENTS

2010/0110114 A1* 5/2010 Hashimoto .......... G09G 3/3614
345/88
2011/0221715 A1    9/2011 Yang et al.
(Continued)

FOREIGN PATENT DOCUMENTS

CN    106067293 A    11/2016
CN    106896594 A    6/2017
(Continued)

OTHER PUBLICATIONS

Korean Office Action issued in corresponding Korean Patent Application No. 10-2022-7010833 dated Jun. 16, 2023, pp. 1-8.
(Continued)

Primary Examiner — Adam R. Giesy
(74) Attorney, Agent, or Firm — PV IP PC; Wei Te Chung (57) ABSTRACT The present application discloses a liquid crystal display panel, a driving method thereof, and a display device. The liquid crystal display panel includes a pixel structure, which includes a plurality of sub-pixels arranged in a matrix; data lines and scan lines arranged perpendicularly cross each other, wherein each of the sub-pixel groups includes two of the sub-pixels of same color; a first driving unit electrically connected to the scan lines, wherein the first driving unit inputs scan signals to the scan lines in a preset sequence, the sub-pixel groups of the pixel modules sequentially obtain the scan signals, two of the sub-pixels in each of the sub-pixel groups obtain the scan signals at a same time, and
(Continued)

two of the sub-pixels in a same one of the sub-pixel groups obtain the scan signals at a same time.

18 Claims, 5 Drawing Sheets

(52) U.S. Cl.
CPC ......... *G09G 3/3614* (2013.01); *G09G 3/3666* (2013.01); *G09G 3/2074* (2013.01); *G09G 2300/0426* (2013.01); *G09G 2300/0452* (2013.01); *G09G 2310/0205* (2013.01); *G09G 2310/021* (2013.01); *G09G 2310/0213* (2013.01); *G09G 2320/0242* (2013.01)

(58) Field of Classification Search
CPC ..... G09G 2300/0452; G09G 2310/021; G09G 2310/0213; G09G 2320/0242
See application file for complete search history.

(56) References Cited

U.S. PATENT DOCUMENTS

| | | | |
|---|---|---|---|
| 2011/0315991 A1 | 12/2011 | Sugihara et al. | |
| 2017/0061844 A1* | 3/2017 | Wang | G09G 3/3648 |
| 2018/0107075 A1 | 4/2018 | Chang | |
| 2020/0211486 A1 | 7/2020 | Wang et al. | |

FOREIGN PATENT DOCUMENTS

| | | | |
|---|---|---|---|
| CN | 109613778 A | 4/2019 | |
| CN | 110853595 A | 2/2020 | |
| CN | 111446262 A | 7/2020 | |
| CN | 113552752 A | 10/2021 | |
| JP | 2009122679 | 6/2009 | |
| JP | 2009300748 | 12/2009 | |
| KR | 20020020418 A | 3/2002 | |
| KR | 20210086295 A | 7/2021 | |

OTHER PUBLICATIONS

International Search Report in International application No. PCT/CN2021/136787, mailed on Aug. 25, 2022.
Written Opinion of the International Search Authority in International application No. PCT/CN2021/136787, mailed on Aug. 25, 2022.
Chinese Office Action issued in corresponding Chinese Patent Application No. 202111442198.5 dated Jul. 5, 2022, pp. 1-6.
Japanese Office Action issued in corresponding Japanese Patent Application No. 特願2021-576118 dated Feb. 13, 2024, pp. 1-3.

* cited by examiner

LIQUID CRYSTAL DISPLAY PANEL, DRIVING METHOD THEREOF, AND DISPLAY DEVICE

BACKGROUND OF INVENTION

Field of Invention

The present application relates to a field of display technology, and in particular to a liquid crystal display panel, a driving method thereof, and a display device.

Description of Prior Art

Figure 1:
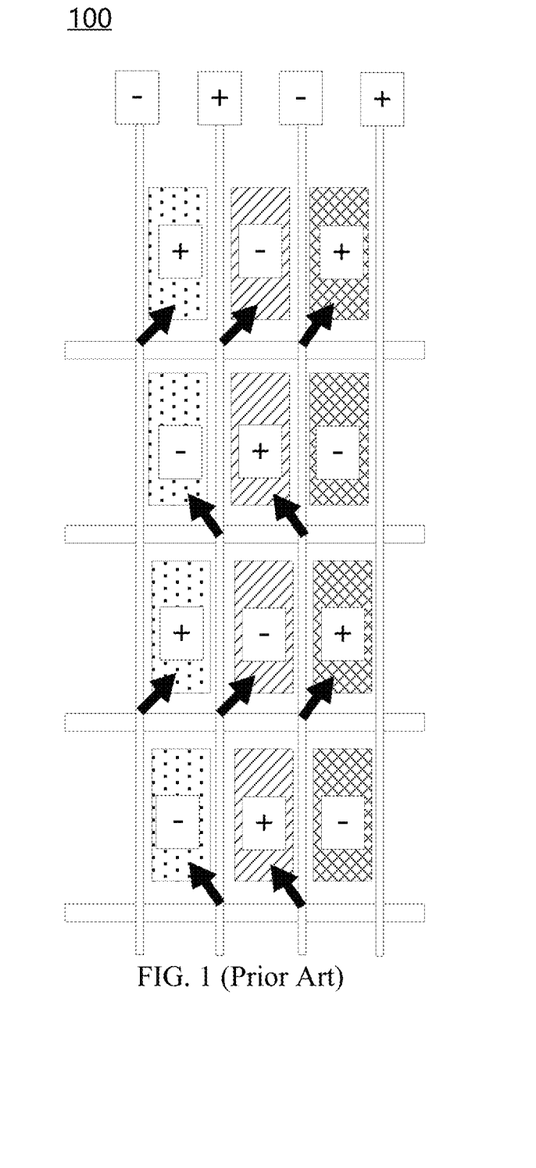
FIG. 1 is a schematic structural diagram of a conventional pixel structure.

In liquid crystal displays (LCDs), in order to alleviate a problem of dynamic picture tailing caused by low refresh rates of some products, the existing one-line (1-line) scan of the whole device can be changed to the two-line (2-line) scan, which can double the refresh rate of dynamic pictures without increasing cost. However, in a pixel structure of an existing liquid crystal display panel, as shown in FIG. 1, which is a schematic structural diagram of an existing pixel structure, since in the pixel structure, pixels in adjacent ones of the rows have different colors, when performing the 2-line scan, sub-pixels in two adjacent rows sharing the same data signal have different colors. For example, a green pixel in the first row and the second column and a red pixel in the second row and the first column share the same data signal, and a mixed color flow will appear when sharing the same data signal. Therefore, in order to realize the 2-line scan function, there is a need to design a new pixel architecture.

SUMMARY OF INVENTION

An object of the present invention is to provide a liquid crystal display panel, a driving method thereof, and a display device, which support a 2-line driving mode.

In order to achieve the above object, the present invention provides a liquid crystal display panel, including a pixel structure, wherein the pixel structure includes: a plurality of sub-pixels arranged in a matrix, wherein colors of three adjacent ones of the sub-pixels located in a same row are different, and colors of all the sub-pixels located in a same column are same; and data lines and scan lines arranged perpendicularly cross each other, wherein the data lines are located between two adjacent columns of the sub-pixels, the scan lines are located between two adjacent rows of the sub-pixels, each of the data lines is connected to two or more pixel modules, each of the pixel modules includes three sub-pixel groups, and each of the sub-pixel groups includes two of the sub-pixels of same color; and a first driving unit electrically connected to the scan lines, wherein the first driving unit inputs scan signals to the scan lines in a preset sequence, the sub-pixel groups of the pixel modules sequentially obtain the scan signals, and two of the sub-pixels in a same one of the sub-pixel groups obtain the scan signals at a same time.

Further, two of the sub-pixels of each of the sub-pixel groups are arranged adjacent to each other in the same column.

Further, the pixel modules include at least a first pixel module and a second pixel module; the three sub-pixel groups are respectively: a first sub-pixel group including two first sub-pixels, a second sub-pixel group including two second sub-pixels, and a third sub-pixel group including two third sub-pixels; the first sub-pixel group, the second sub-pixel group, and the third sub-pixel group are respectively located in adjacent columns; and the data lines are sequentially connected to the first pixel module and the second pixel module.

Further, in the first pixel module, each of the data lines is sequentially connected to the two first sub-pixels of the first sub-pixel group, the two second sub-pixels of the second sub-pixel group, and the two third sub-pixels of the third sub-pixel group.

Further, in the first pixel module, each of the data lines is sequentially connected to the two second sub-pixels of the second sub-pixel group, the two third sub-pixels of the third sub-pixel group, and the two first sub-pixels of the first sub-pixel group.

Further, in the first pixel module, each of the data lines is sequentially connected to the two third sub-pixels of the third sub-pixel group, the two second sub-pixels of the second sub-pixel group, and the two first sub-pixels of the first sub-pixel group.

Further, in the first pixel module, each of the data lines is sequentially connected to the two first sub-pixels of the first sub-pixel group, the two third sub-pixels of the third sub-pixel group, and two second sub-pixels of the second sub-pixel group.

Further, in the first pixel module, each of the data lines is sequentially connected to the two second sub-pixels of the second sub-pixel group, the two first sub-pixels of the first sub-pixel group, and the two third sub-pixels of the third sub-pixel group.

Further, in the first pixel module, each of the data lines is sequentially connected to the two third sub-pixels of the third sub-pixel group, the two first sub-pixels of the first sub-pixel group, and the two second sub-pixels of the second sub-pixel group.

Further, in the second pixel module, each of the data lines ais sequentially connected to the two first sub-pixels of the first sub-pixel group, the two second sub-pixels of the second sub-pixel group, and the two third sub-pixels of the third sub-pixel group.

Further, in the second pixel module, each of the data lines is sequentially connected to the two second sub-pixels of the second sub-pixel group, the two third sub-pixels of the third sub-pixel group, and the two first sub-pixels of the first sub-pixel group.

Further, in the second pixel module, each of the data lines is sequentially connected to the two third sub-pixels of the third sub-pixel group, the two second sub-pixels of the second sub-pixel group, and the two first sub-pixels of the first sub-pixel group.

Further, in the second pixel module, each of the data lines is sequentially connected to the two first sub-pixels of the first sub-pixel group, the two third sub-pixels of the third sub-pixel group, and the two second sub-pixels of the second sub-pixel group.

Further, in the second pixel module, each of the data lines is sequentially connected to the two second sub-pixels of the second sub-pixel group, the two first sub-pixels of the first sub-pixel group, and two third sub-pixels of the third sub-pixel group.

Further, in the second pixel module, each of the data lines is sequentially connected to the two third sub-pixels of the third sub-pixel group, the two first sub-pixels of the first sub-pixel group, and the two second sub-pixels of the second sub-pixel group.

In order to achieve the above-mentioned object, the present invention further provides a method of driving the liquid crystal display panel as described above, including the following steps: controlling the first driving unit to input the scan signals to the scan lines in the preset sequence, the sub-pixel groups of each of the pixel modules sequentially obtaining the scan signals, and two of sub-pixels in a same one of the sub-pixel groups obtaining the scan signals at a same time.

Further, in the method of driving the liquid crystal display panel, the pixel structure has at least one scan period; the preset sequence includes, in a scan period, along a sequence of the data line connecting the sub-pixel groups, the first driving unit first inputting the scan signals to the scan lines connected to the pixel modules, and then inputting the scan signals to the scan lines connected to another one of the pixel modules.

Further, in the method of driving the liquid crystal display panel, two of the sub-pixels of each of the sub-pixel groups are arranged adjacent to each other in the same column.

Further, in the method of driving the liquid crystal display panel, the pixel modules comprise at least a first pixel module and a second pixel module; the three sub-pixel groups are respectively: a first sub-pixel group comprising two first sub-pixels, a second sub-pixel group comprising two second sub-pixels, and a third sub-pixel group comprising two third sub-pixels; the first sub-pixel group, the second sub-pixel group, and the third sub-pixel group are respectively located in adjacent columns; and the data lines are sequentially connected to the first pixel module and the second pixel module.

the pixel structure has at least one scan period; the preset sequence includes, in a scan period, along a sequence of the data line connecting the sub-pixel groups, the first driving unit first inputting the scan signals to the scan lines connected to the pixel modules, and then inputting the scan signals to the scan lines connected to another one of the pixel modules.

In order to achieve the above-mentioned object, the present invention also provides a display device including a backlight source and the liquid crystal display panel as described above, wherein the backlight source is connected to the liquid crystal display panel and configured to provide backlight for the liquid crystal display panel.

Technical effect of the present invention is to provide a liquid crystal display panel, a driving method thereof, and a display device. In the pixel structure of the liquid crystal display panel, the color of two vertically adjacent sub-pixels in one of the pixel modules is the same, so that when a 2-line driving mode is performed, the sub-pixels in two adjacent rows share the same data signal, and color mixing phenomenon will not appear, thereby perfectly supporting the 2-line driving mode to improve the display effect.

BRIEF DESCRIPTION OF DRAWINGS

The following detailed description of the specific implementations of the present application in conjunction with the accompanying drawings will make the technical solutions and other beneficial effects of the present application obvious.

Elements in the drawings are designated by reference numerals listed below.
100, pixel structure;
101, first sub-pixel;
102, second sub-pixel;
103, third sub-pixel;
10, first driving unit;
20, second driving unit.

DETAILED DESCRIPTION OF PREFERRED EMBODIMENTS

The technical solutions in the embodiments of the present application will be clearly and completely described in the following with reference to the accompanying drawings in the embodiments. In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

Embodiment 1

Figure 2:
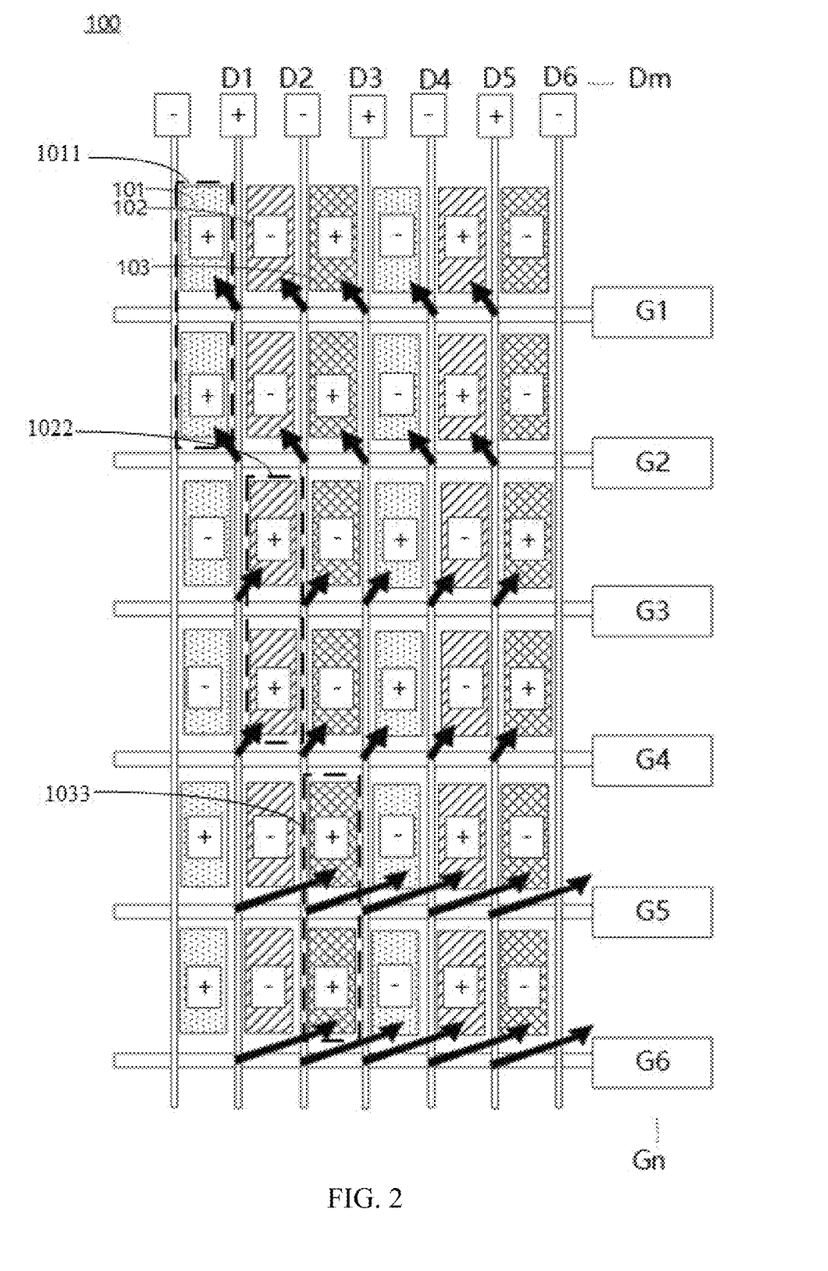
FIG. 2 is a schematic structural diagram of a first pixel module of a pixel structure provided in Embodiment 1 of the present application.
Figure 3:
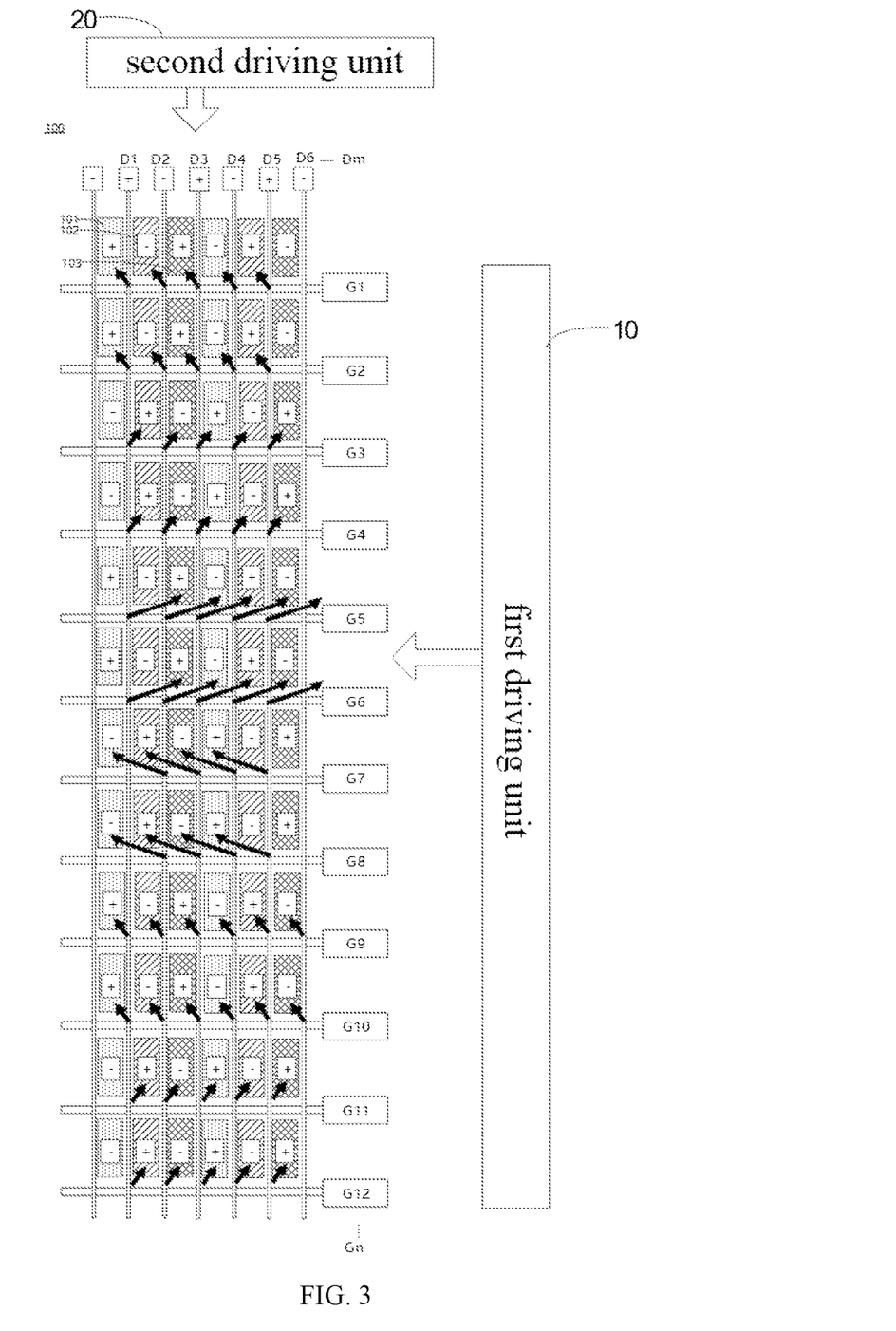
FIG. 3 is a schematic structural diagram of 12 rows of sub-pixels as one scan period provided by Embodiment 1 of the present application.
Figure 4:
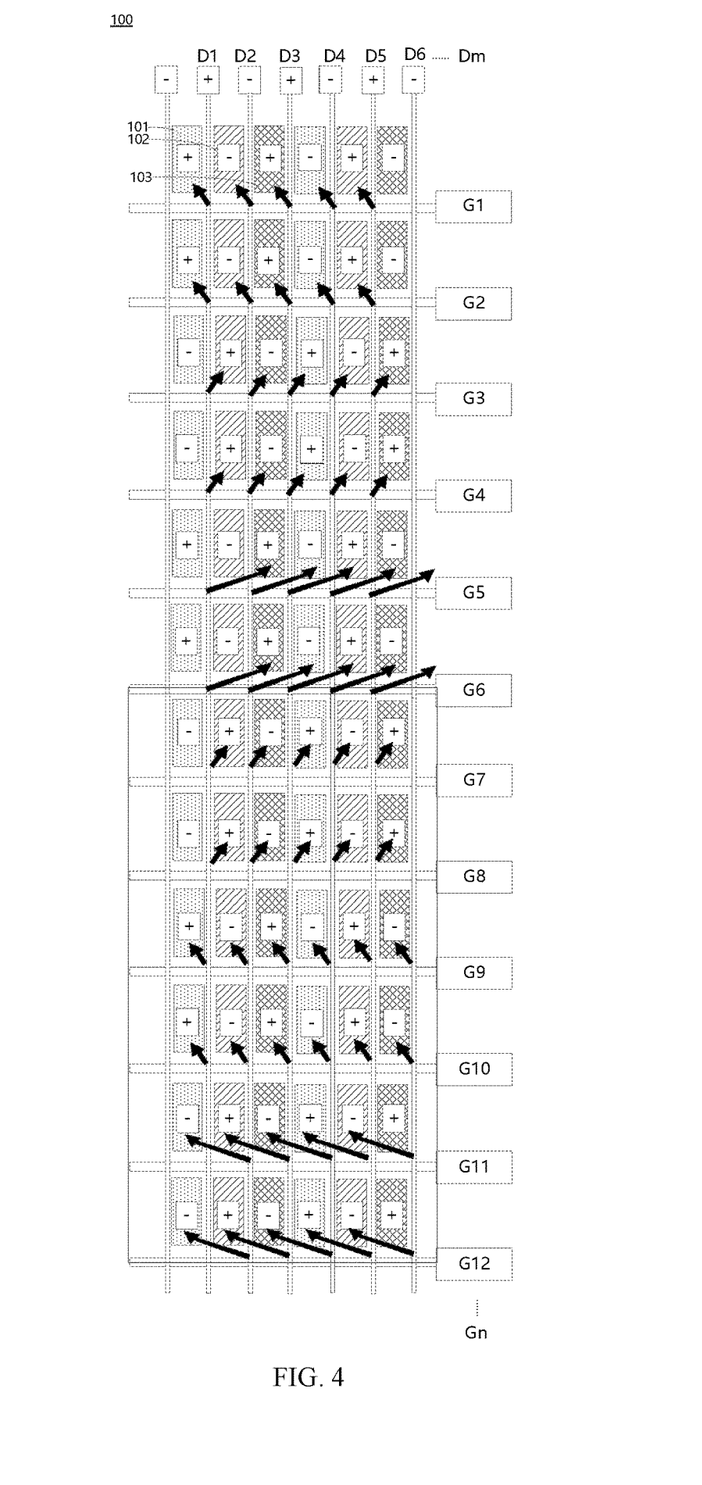
FIG. 4 is a schematic structural diagram of a second pixel module in the pixel structure provided in Embodiment 1 of the present application.

As shown in FIGS. 2 to 4, the present application discloses a liquid crystal display panel. The liquid crystal display panel includes a pixel structure 100 for realizing a display mode of a 2-line scan.

The pixel structure 100 includes: a plurality of sub-pixels arranged in a matrix, and data lines and scan lines arranged perpendicularly cross each other. Colors of sub-pixels in a same column are the same, and colors of three adjacent sub-pixels in a same row are different. Each of the data lines is located between two adjacent columns of sub-pixels, and each of the scan lines is located between two adjacent rows of sub-pixels.

In an embodiment of the present application, a number of data lines is m and a number of scan lines is n. The m data lines parallel to each other are: D1, D2, D3, ... (Dm-2), (Dm-1), and Dm; and the n scan lines parallel to each other are G1, G2, G3, (Gn-2), (Gn-1), and Gn.

Referring to FIGS. 2 to 4, a plurality of first sub-pixels 101 are arranged in a matrix to form a first column of pixels and are located at a left side of the first data line D1, a plurality of second sub-pixels 102 are arranged in a matrix to form a second column of pixels and are located at a left side of the second data line D2, a plurality of third sub-pixels 103 are arranged in a matrix to form a third column of pixels and located at a left side of the third data line D3, a plurality of first sub-pixels 101 are arranged in a matrix to form a fourth column of pixels and located at a left side of the fourth data line D4, and so on. Simply speaking, all sub-pixels in the same column have the same color, and three sub-pixels with different colors are cyclically arranged in an order of the first sub-pixel 101, the second sub-pixel 102, and the third sub-pixel 103 in a row direction, or cyclically arranged in an order of the second sub-pixel 102, the third sub-pixel 103, and the first sub-pixel 101, or cyclically arranged in an order of the third sub-pixel 103, the first sub-pixel 101, and the second sub-pixel 102.

Each of the data lines is connected to two or more pixel modules, each of the pixel modules includes three sub-pixel groups, and each of the sub-pixel groups includes two of the sub-pixels of same color; that is, each of the pixel modules includes 6 sub-pixels.

Further, the sub-pixel groups of the pixel modules sequentially obtain scan signals, and two of the sub-pixels in a same one of the sub-pixel groups obtain the scan signals at a same time.

Specifically, the liquid crystal display panel further includes a first driving unit 10, which is electrically connected to the scan lines, wherein the first driving unit simultaneously inputs scan signals to two scan lines connected to two sub-pixels in one sub-pixel group, so that two sub-pixels in one sub-pixel group obtain scan signals at the same time. The pixel structure 100 in an embodiment of the present application supports the 2-line driving mode, and the original pixel connection manner is changed, which solves the problem in the prior art that a flip architecture does not support the 2-line driving mode.

Each of the pixel modules includes at least a first pixel module and a second pixel module; and the three sub-pixel groups are respectively: a first sub-pixel group including two first sub-pixels 101, a second sub-pixel group including two second sub-pixels 102, and a third sub-pixel group including two third sub-pixels 103; and the sub-pixels include a first sub-pixel 101, a second sub-pixel 102, and a third sub-pixel 103 of different colors. The first sub-pixel 101 may be, for example, a red sub-pixel, the second sub-pixel 102 may be, for example, a green sub-pixel, and the third sub-pixel 103 may be, for example, a blue sub-pixel.

In the first pixel module, each of the data lines is sequentially connected to the two first sub-pixels 101 of the first sub-pixel group, the two second sub-pixels 102 of the second sub-pixel group, and the two third sub-pixels 103 of the third sub-pixel group in an extending direction of the data line. Specifically, as shown in FIG. 2, the first data line D1 sequentially connects the two first sub-pixels 101 of the first sub-pixel group 1011, the two second sub-pixels 102 of the second sub-pixel group 1022, and the two third sub-pixels 103 of the third sub-pixel group 1033. The second data line D2 is sequentially connected to the two second sub-pixels 102 of the second sub-pixel group 1022, the two third sub-pixels 103 of the third sub-pixel group 1033, and the two first sub-pixels 101 of the first sub-pixel group 1011. The third data line D3 sequentially connects the two third sub-pixels 103 of the third sub-pixel group 1033, the two first sub-pixels 101 of the first sub-pixel group 1011, and the two second sub-pixels 102 of the second sub-pixel group 1022.

In an embodiment of the present application, the first data line D1 connected to two pixel modules is taken as an example. In the first pixel module including the first sub-pixel group 1011, the second sub-pixel group 1022 and the third sub-pixel group 1033 in the extending direction of the first data line D1, when a first sub-pixel 101 is located in the x-th row and y-th column, another first sub-pixel 101 is located in the x+1-th row and y-th column; the two second sub-pixels 102 are respectively located in the x+2-th row and y+1-th column and in x+3-th row and y+1-th column; and the two third sub-pixels 103 are respectively located in x+4-th row and column y+2 and in x+5-th row and y+2-th column, where x and y are natural numbers. The first sub-pixel 101 in the x-th row and y-th column is the first sub-pixel 101 in the upper left corner of FIG. 2.

The pixel structure 100 has at least one scan period; in one scan period, the first driving unit inputs scan signals to each scan line in a preset sequence.

Specifically, referring to FIG. 3, the pixel structure 100 has a plurality of scan periods. In an embodiment of the present application, the first driving unit 10 first scans the sub-pixels from a 1st row to the 12th row as a first scan period, and then scan the adjacent sub-pixels from a 13th row to a 24th row as a second scan period . . . , and so on.

The preset sequence is: a sequence of the data line connecting the sub-pixel groups. As shown in FIG. 3, in a scan period, the first driving unit 10 first inputs scan signals to the scan lines (such as scan lines G1, G2) connected to the first sub-pixel group; then inputs scan signals to the scan lines (such as scan lines G3, G4) connected to the second sub-pixel group; and then, inputs scan signals to the scan lines (such as scan lines G5, G6) connected to the third sub-pixel group. The first driving unit inputs scan signals to each sub-pixel group through scan lines in the above sequence.

The liquid crystal display panel further includes: a second driving unit 20 electrically connected to the data line. The second driving unit 20 inputs a positive grayscale voltage to the data lines located in even-numbered columns (such as D1, D3, D5, D7, etc.), and input a negative gray-scale voltage to the data lines located in odd-numbered columns (such as D2, D4, D6, etc.). Of course, in other embodiments, in a scan period, the second driving unit inputs a negative gray-scale voltage to the data lines in the odd-numbered columns, and inputs a positive gray-scale voltage to the data lines in the even-numbered columns.

It should be noted that in the prior art, in a pixel architecture, the colors of three adjacent sub-pixels located in the same row are different, and the colors of all sub-pixels located in the same column are the same. The same data line is connected to sub-pixels of different colors in two adjacent rows, such as G sub-pixels and R sub-pixels. If a user wants to drive the G pixels in the first row, the sub-pixels in the first row and the sub-pixels in the second row both can achieve display because the 2-line display mode is to make the sub-pixels in the first row and the sub-pixels in the second row receive the same data signal. Therefore, the G sub-pixels of the second row connected to the same data line will also be driven, which will cause the sub-pixels in two adjacent rows connected to the same data line to appear color mixing phenomenon, that is, the display of G pixels becomes the display of R and G pixels.

However, in an embodiment of the present application, a charging path of the first pixel module of the first data line D1 is: RR→GG→BB; a charging path of the first pixel module of the second data line D2 is: GG→BB→RR; a charging path of the first pixel module of the third data line D3 is: BB→RR→GG; a charging path of the fourth data line D4 is the same as the charging path of the first data line D1, a charging path of the fifth data line D5 is the same as the charging path of the second data lines D2, and so on. Compared with a charging path of R→G→B, or G→B→R, or B→R→G in the prior art, the charging paths of the first pixel module of these data lines in an embodiment of the present application are in a flip architecture, and two adjacent sub-pixels sharing the same data signal have the same color when performing 2-line driving mode, so that color mixing phenomenon will not appear, thereby perfectly supporting the mode of the 2-line driving mode to improve the display effect.

In an embodiment of the present application, the first data line D1 connected to two pixel modules is taken as an example. Referring to FIG. 4, the part enclosed by the black frame in FIG. 4 represents the second pixel module. In the second pixel module, each of the data lines is sequentially connected to the two second sub-pixels 102 of the second sub-pixel group, the two first sub-pixels 101 of the first sub-pixel group, and the two third sub-pixels 103 of the third sub-pixel group. In the second pixel module, the first one of the second sub-pixels is located in the x+6-th row and the y+1-th column, and another one of the second sub-pixels is located in the x+7-th row and the y+1-th column; the two first sub-pixels are respectively located in x+8-th row and y-th column and in x+9-th row and y-th column; and the two third sub-pixels are respectively located in x+10-th row and y−2-th column and in x+11-th row and y−2-th column.

In the second scan period, the first driving unit 10 first inputs scan signals to the scan lines (such as scan lines G7, G8) connected to the second sub-pixel group; then inputs scan signals to the scan lines (such as scan lines G9, G10) connected to the first sub-pixel group; and then, inputs scan signals to the scan lines (such as scan lines G11, G12) connected to the third sub-pixel group. The first driving unit inputs scan signals to each sub-pixel group through scan lines in the above sequence. Therefore, in an embodiment of the present application, a charging path of the first pixel module and the second pixel module of the first data line D1 is: RR→GG→BB→GG→RR→BB, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

Further, in an embodiment of the present application, a charging path of the first pixel module and the second pixel module of the second data line D2 is: GG→BB→RR→BB→GG→RR; a charging path of the first pixel module and the second pixel module of the third data line D3 is: BB→RR→GG→RR→BB→GG; a charging path of the fourth data line D4 is the same as the charging path of the first data line D1, a charging path of the fifth data line D5 is the same as the charging path of the second data lines D2, and so on.

An embodiment of the present application further provides a method of driving a liquid crystal display panel, which includes the pixel structure 100 described above, and the driving method includes the following steps S100-S200.

S100. controlling the first driving unit to input the scan signals to the scan lines in the preset sequence, the sub-pixel groups of each of the pixel modules sequentially obtaining the scan signals, and two of sub-pixels in a same one of the sub-pixel groups obtaining the scan signals at a same time.

Referring to FIGS. 2 to 4, each of the data lines is sequentially connected to the two first sub-pixels 101 of the first sub-pixel group, the two second sub-pixels 102 of the second pixel module, and the two third sub-pixels 103 of the third sub-pixel group. The sub-pixels include a first sub-pixel 101, a second sub-pixel 102, and a third sub-pixel 103 of different colors. The first sub-pixel 101 may be, for example, a red pixel, the second sub-pixel 102 may be, for example, a green sub-pixel, and the third sub-pixel 103 may be, for example, a blue sub-pixel.

In the first pixel module, each of the data lines is sequentially connected to the two first sub-pixels 101 of the first sub-pixel group, the two second sub-pixels 102 of the second sub-pixel group, and the two third sub-pixels 103 of the third sub-pixel group.

When a first sub-pixel 101 is located in the x-th row and y-th column, another first sub-pixel 101 is located in the x+1-th row and y-th column; the two second sub-pixels 102 are respectively located in the x+2-th row and y+1-th column and in x+3-th row and y+1-th column; and the two third sub-pixels 103 are respectively located in x+4-th row and column y+2 and in x+5-th row and y+2-th column, where x and y are natural numbers. The first sub-pixel 101 in the x-th row and y-th column is the first sub-pixel 101 in the upper left corner of FIG. 1.

The first driving unit inputs scan signals to two scan lines at the same time, and two sub-pixels of a same color in a sub-pixel group obtain the scan signals at the same time. The pixel structure 100 in an embodiment of the present application supports the 2-line driving mode, and when the first pixel module obtains scan signals, the first driving unit 10 first inputs scan signals to the scan lines (such as scan lines G1, G2) connected to the first sub-pixel group; then inputs scan signals to the scan lines (such as scan lines G3, G4) connected to the second sub-pixel group; and then, inputs scan signals to the scan lines (such as scan lines G5, G6) connected to the third sub-pixel group. The first driving unit inputs scan signals to each sub-pixel group through scan lines in the above sequence.

In an embodiment of the present application, referring to FIG. 4, the part enclosed by the black frame in FIG. 4 represents the second pixel module. In the second pixel module, each of the data lines is sequentially connected to the two second sub-pixels 102 of the second sub-pixel group, the two first sub-pixels 101 of the first sub-pixel group, and the two third sub-pixels 103 of the third sub-pixel group. In the second pixel module, the first one of the second sub-pixels is located in the x+6-th row and the y+1-th column, and another one of the second sub-pixels is located in the x+7-th row and the y+1-th column; the two first sub-pixels are respectively located in x+8-th row and y-th column and in x+9-th row and y-th column; and the two third sub-pixels are respectively located in x+10-th row and y−2-th column and in x+11-th row and y−2-th column.

It should be noted that in the prior art, in a pixel architecture, the colors of three adjacent sub-pixels located in the same row are different, and the colors of all sub-pixels located in the same column are the same. The same data line is connected to sub-pixels of different colors in two adjacent rows, such as G sub-pixels and R sub-pixels. If a user wants to drive the G pixels in the first row, the sub-pixels in the first row and the sub-pixels in the second row both can achieve display because the 2-line display mode is to make the sub-pixels in the first row and the sub-pixels in the second row receive the same data signal. Therefore, the G sub-pixels of the second row connected to the same data line will also be driven, which will cause the sub-pixels in two adjacent rows connected to the same data line to appear color mixing phenomenon, that is, the display of G pixels becomes the display of R and G pixels.

However, in an embodiment of the present application, a charging path of the first pixel module of the first data line D1 is: RR→GG→BB; a charging path of the first pixel module of the second data line D2 is: GG→BB→RR; a charging path of the first pixel module of the third data line D3 is: BB→RR→GG; a charging path of the fourth data line D4 is the same as the charging path of the first data line D1, a charging path of the fifth data line D5 is the same as the charging path of the second data lines D2, and so on. Compared with a charging path of R→G→B, or G→B→R, or B→R→G in the prior art, the charging paths of the first pixel module of these data lines in an embodiment of the present application are in a flip architecture, two adjacent sub-pixels sharing the same data signal have the same color when performing 2-line driving mode, so that color mixing phenomenon will not appear, thereby perfectly supporting the mode of the 2-line driving mode to improve the display effect.

S200. in a scan period, the first driving unit first inputs a scan signal to a scan line connected to a pixel module, and then inputs a scan signal to another scan line connected to another pixel module.

The pixel structure 100 has a plurality of scan periods. In an embodiment of the present application, the first driving unit 10 first scans the sub-pixels from a 1st row to the 12th row as a first scan period, and then scan the adjacent sub-pixels from a 13th row to a 24th row as a second scan period . . . , and so on.

The first pixel module includes the sub-pixels in the first row to the sixth row, and the sub-pixels in 12 rows are scanned in one scan period, which is equivalent to scanning two pixel modules. In an embodiment of the present application, the scan of the second pixel module is performed after the scan of the first pixel module is performed; or the scan of the second pixel module is performed first, and then the scan of the first pixel module is performed.

Therefore, in an embodiment of the present application, Therefore, in an embodiment of the present application, a charging path of the first pixel module and the second pixel module of the first data line D1 is: RR→GG→BB→G-G→RR→BB, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

Further, in an embodiment of the present application, the charging path of the first pixel module and the second pixel module of the second data line D2 is: GG→BB→RR→BB→GG→RR; the charging path of the first pixel module and the second pixel module of the third data line D3 is: BB→RR→GG→RR→BB→GG; the charging path of the fourth data line D4 is the same as the charging path of the first data line D1, the charging path of the fifth data line D5 is the same as the charging path of the second data line D2, and so on.

A further embodiment of the present application provides a display device, including a backlight source and the aforementioned liquid crystal display panel, and the backlight source is connected to the liquid crystal display panel and configured to provide a backlight for the liquid crystal display panel.

Embodiment 2

This embodiment also provides a liquid crystal display panel, a driving method thereof, and a display device, which include most of the technical solutions of Embodiment 1, except that a charging path of the first pixel module and the second pixel module of the first data line D1 is: RR→GG→BB→BB→RR→GG.

Figure 5:
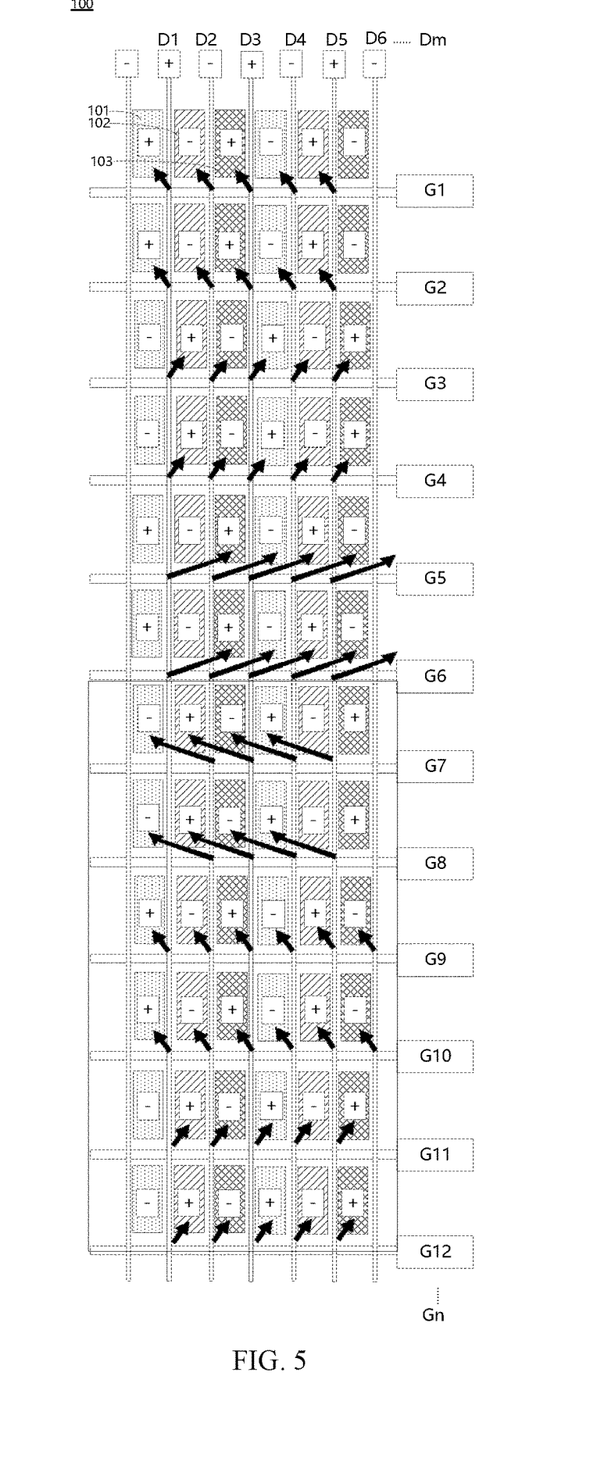
FIG. 5 is a schematic structural diagram of a second pixel module in the pixel structure provided in Embodiment 2 of the present application.

Specifically, as shown in FIG. 5, the part enclosed by the black frame in FIG. 5 represents the second pixel module. In the second pixel module, each of the data lines is sequentially connected to the two third sub-pixels 103 of the third sub-pixel group, the two first sub-pixels 101 of the first sub-pixel group, and the two second sub-pixels 102 of the second sub-pixel group. In the second pixel module, the first one of the third sub-pixels 103 is located in the x+6-th row and the y−1-th column, and another one of the third sub-pixels 103 is located in the x+7-th row and the y−1-th column; the two first sub-pixels 101 are respectively located in x+8-th row and y-th column and in x+9-th row and y-th column; and the two second sub-pixels 102 are respectively located in x+10-th row and y+1-th column and in x+11-th row and y+1-th column.

In the second scan period, the first driving unit 10 first inputs scan signals to the scan lines (such as scan lines G7 and G8) connected to the third sub-pixel group; then inputs scan signals to the scan lines (such as scan lines G9, G10) connected to the first sub-pixel group; and then inputs scan signals to scan lines (such as scan lines G11, G12) connected to the second sub-pixel group. The first driving unit inputs scan signals to each sub-pixel group through scan lines in the above sequence. Therefore, in an embodiment of the present application, the charging path of the first pixel module and the second pixel module of the first data line D1 is: RR→GG→BB→BB→RR→GG, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

Embodiment 3

This embodiment also provides a liquid crystal display panel, a driving method thereof, and a display device, which include most of the technical solutions of Embodiment 1, except that a charging path of the first pixel module and the second pixel module of the first data line D1 is: RR→GG→BB→RR→GG→BB.

In the second pixel module, the first data line D1 is sequentially connected to the two first sub-pixels 101 of the first sub-pixel group, the two second sub-pixels 102 of the second sub-pixel group, and the two third sub-pixels 103 of the third sub-pixel group. In the second pixel module, the first one of the first sub-pixels 101 is located in the x+6-th row and the y−1-th column, and another one of the first sub-pixels 101 is located in the x+7-th row and the y−1-th column; the two second sub-pixels 102 are respectively located in x+8-th row and y-th column and in x+9-th row and y-th column; and the two third sub-pixels 103 are respectively located in x+10-th row and y+1-th column and in x+11-th row and y+1-th column.

In the second scan period, the first driving unit 10 first inputs scan signals to the scan lines (such as scan lines G7 and G8) connected to the third sub-pixel group; then inputs scan signals to the scan lines (such as scan lines G9, G10) connected to the first sub-pixel group; and then inputs scan signals to scan lines (such as scan lines G11, G12) connected to the second sub-pixel group. The first driving unit inputs scan signals to each sub-pixel group through scan lines in the above sequence. Therefore, in an embodiment of the present application, the charging path of the first pixel module and the second pixel module is: RR→GG→BB→RR→GG→BB, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

Embodiment 4

This embodiment also provides a liquid crystal display panel, a driving method thereof, and a display device, which include most of the technical solutions of Embodiment 1, except that a charging path of the first pixel module and the second pixel module of the first data line D1 is: RR→GG→BB→RR→BB→GG.

In the second pixel module, the first data line D1 is sequentially connected to the two first sub-pixels 101 of the first sub-pixel group, the two third sub-pixels 103 of the third sub-pixel group, and the two second sub-pixels 102 of the second sub-pixel group. In the second pixel module, the first one of the first sub-pixels 101 is located in the x+6-th row and the y−1-th column, and another one of the first sub-pixels 101 is located in the x+7-th row and the y−1-th column; the two third sub-pixels 103 are respectively located in x+8-th row and y-th column and in x+9-th row and y-th column; and the two second sub-pixels 102 are respectively located in x+10-th row and y+1-th column and in x+11-th row and y+1-th column.

In the second scan period, the first driving unit 10 first inputs scan signals to the scan lines (such as scan lines G7 and G8) connected to the third sub-pixel group; then inputs scan signals to the scan lines (such as scan lines G9, G10) connected to the first sub-pixel group; and then inputs scan signals to scan lines (such as scan lines G11, G12) connected to the second sub-pixel group. The first driving unit inputs scan signals to each sub-pixel group through scan lines in the above sequence. Therefore, in an embodiment of the present application, the charging path of the first pixel module and the second pixel module is: RR→GG→BB→RR→BB→GG, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

Embodiment 5

This embodiment also provides a liquid crystal display panel, a driving method thereof, and a display device, which include most of the technical solutions of Embodiment 1, except that a charging path of the first pixel module and the second pixel module of the first data line D1 is: RR→GG→BB→BB→GG→RR.

In the second pixel module, the first data line D1 is sequentially connected to the two third sub-pixels 103 of the third sub-pixel group, the two second sub-pixels 102 of the second sub-pixel group, and the two first sub-pixels 101 of the first sub-pixel group. In the second pixel module, the first one of the third sub-pixels 103 is located in the x+6-th row and the y−1-th column, and another one of the third sub-pixels 103 is located in the x+7-th row and the y−1-th column; the two second sub-pixels 102 are respectively located in x+8-th row and y-th column and in x+9-th row and y-th column; and the two first sub-pixels 101 are respectively located in x+10-th row and y+1-th column and in x+11-th row and y+1-th column.

In the second scan period, the first driving unit 10 first inputs scan signals to the scan lines (such as scan lines G7 and G8) connected to the third sub-pixel group; then inputs scan signals to the scan lines (such as scan lines G9, G10) connected to the first sub-pixel group; and then inputs scan signals to scan lines (such as scan lines G11, G12) connected to the second sub-pixel group. The first driving unit inputs scan signals to each sub-pixel group through scan lines in the above sequence. Therefore, in an embodiment of the present application, the charging path of the first pixel module and the second pixel module is: RR→GG→BB→BB→GG→RR, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

Embodiment 6

This embodiment also provides a liquid crystal display panel, a driving method thereof, and a display device, which include most of the technical solutions of Embodiment 1, except that a charging path of the first pixel module and the second pixel module of the first data line D1 is: RR→GG→BB→GG→BB→RR.

In the second pixel module, the first data line D1 is sequentially connected to the two second sub-pixels 102 of the third sub-pixel group, the two third sub-pixels 103 of the second sub-pixel group, and the two first sub-pixels 101 of the first sub-pixel group. In the second pixel module, the first one of the second sub-pixels 102 is located in the x+6-th row and the y−1-th column, and another one of the second sub-pixels 102 is located in the x+7-th row and the y−1-th column; the two third sub-pixels 103 are respectively located in x+8-th row and y-th column and in x+9-th row and y-th column; and the two first sub-pixels 101 are respectively located in x+10-th row and y+1-th column and in x+11-th row and y+1-th column.

In the second scan period, the first driving unit 10 first inputs scan signals to the scan lines (such as scan lines G7 and G8) connected to the third sub-pixel group; then inputs scan signals to the scan lines (such as scan lines G9, G10) connected to the first sub-pixel group; and then inputs scan signals to scan lines (such as scan lines G11, G12) connected to the second sub-pixel group. The first driving unit inputs scan signals to each sub-pixel group through scan lines in the above sequence. Therefore, in an embodiment of the present application, the charging path of the first pixel module and the second pixel module is: RR→GG→BB→GG→BB→RR, and the first pixel module and the second pixel module are regarded as one cycle, wherein a charging path of the third pixel module and the fourth pixel module is the same as the charging path of the first pixel module and the second pixel module, a charging path of the fifth pixel module and the sixth pixel module is the same as the charging path of the first pixel module and the second pixel module, and so on.

The above embodiments are merely illustrative. In other embodiments, the charging paths of the first pixel module and the second pixel module may also be arrangement and combination of three pixels of RR, GG, and BB, and the principle of the pixel arrangement is the same as that disclosed in the above embodiments, which will not be repeated herein for brevity.

Embodiments of the present application provide a liquid crystal display panel, a driving method thereof, and a display device. In the pixel structure of the liquid crystal display panel, the color of two vertically adjacent sub-pixels in one of the pixel modules is the same, so that when a 2-line driving mode is performed, the sub-pixels in two adjacent rows share the same data signal, and color mixing phenomenon will not appear, thereby perfectly supporting the 2-line driving mode to improve the display effect.

The liquid crystal display panel, the driving method thereof, and the display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A liquid crystal display panel, comprising a pixel structure, wherein the pixel structure comprises:
   a plurality of sub-pixels arranged in a matrix, wherein colors of three adjacent ones of the sub-pixels located in a same row are different, and colors of all the sub-pixels located in a same column are same; and data lines and scan lines arranged perpendicularly cross each other, wherein each of the data lines is located between two adjacent columns of the sub-pixels, each of the scan lines is located between two adjacent rows of the sub-pixels, each of the data lines is connected to two or more pixel modules, each of the pixel modules comprises three sub-pixel groups with different colors that are misaligned in an extending direction of the data line, and each of the three sub-pixel groups comprises two same color sub-pixels of the sub-pixels which are arranged adjacent to each other in the same column; wherein the two same color sub-pixels are at a same side of the data line; and
   a first driving unit electrically connected to the scan lines, wherein the first driving unit inputs scan signals to the scan lines in a preset sequence, the three sub-pixel groups of the pixel modules sequentially obtain the scan signals, and the two same color sub-pixels in a same one of the three sub-pixel groups obtain the scan signals at a same time.

2. The liquid crystal display panel according to claim 1, wherein the pixel modules comprise at least a first pixel module and a second pixel module; the three sub-pixel groups are respectively: a first sub-pixel group comprising two first sub-pixels, a second sub-pixel group comprising two second sub-pixels, and a third sub-pixel group comprising two third sub-pixels; the first sub-pixel group, the second sub-pixel group, and the third sub-pixel group are respectively located in adjacent columns; and
   the data lines are sequentially connected to the first pixel module and the second pixel module.

3. The liquid crystal display panel according to claim 2, wherein in the first pixel module, each of the data lines is sequentially connected to the two first sub-pixels of the first sub-pixel group, the two second sub-pixels of the second sub-pixel group, and the two third sub-pixels of the third sub-pixel group.

4. The liquid crystal display panel according to claim 2, wherein in the first pixel module, each of the data lines is sequentially connected to the two second sub-pixels of the second sub-pixel group, the two third sub-pixels of the third sub-pixel group, and the two first sub-pixels of the first sub-pixel group.

5. The liquid crystal display panel according to claim 2, wherein in the first pixel module, each of the data lines is sequentially connected to the two third sub-pixels of the third sub-pixel group, the two second sub-pixels of the second sub-pixel group, and the two first sub-pixels of the first sub-pixel group.

6. The liquid crystal display panel according to claim 2, wherein in the first pixel module, each of the data lines is sequentially connected to the two first sub-pixels of the first sub-pixel group, the two third sub-pixels of the third sub-pixel group, and two second sub-pixels of the second sub-pixel group.

7. The liquid crystal display panel according to claim 2, wherein in the first pixel module, each of the data lines is sequentially connected to the two second sub-pixels of the second sub-pixel group, the two first sub-pixels of the first sub-pixel group, and the two third sub-pixels of the third sub-pixel group.

8. The liquid crystal display panel according to claim 2, wherein in the first pixel module, each of the data lines is sequentially connected to the two third sub-pixels of the third sub-pixel group, the two first sub-pixels of the first sub-pixel group, and the two second sub-pixels of the second sub-pixel group.

9. The liquid crystal display panel according to claim 2, wherein in the second pixel module, each of the data lines is sequentially connected to the two first sub-pixels of the first sub-pixel group, the two second sub-pixels of the second sub-pixel group, and the two third sub-pixels of the third sub-pixel group.

10. The liquid crystal display panel according to claim 2, wherein in the second pixel module, each of the data lines is sequentially connected to the two second sub-pixels of the second sub-pixel group, the two third sub-pixels of the third sub-pixel group, and the two first sub-pixels of the first sub-pixel group.

11. The liquid crystal display panel according to claim 2, wherein, in the second pixel module, each of the data lines is sequentially connected to the two third sub-pixels of the third sub-pixel group, the two second sub-pixels of the second sub-pixel group, and the two first sub-pixels of the first sub-pixel group.

12. The liquid crystal display panel according to claim 2, wherein, in the second pixel module, each of the data lines is sequentially connected to the two first sub-pixels of the first sub-pixel group, the two third sub-pixels of the third sub-pixel group, and the two second sub-pixels of the second sub-pixel group.

13. The liquid crystal display panel according to claim 2, wherein in the second pixel module, each of the data lines is sequentially connected to the two second sub-pixels of the second sub-pixel group, the two first sub-pixels of the first sub-pixel group, and two third sub-pixels of the third sub-pixel group.

14. The liquid crystal display panel according to claim 2, wherein in the second pixel module, each of the data lines is sequentially connected to the two third sub-pixels of the third sub-pixel group, the two first sub-pixels of the first sub-pixel group, and the two second sub-pixels of the second sub-pixel group.

15. A method of driving a liquid crystal display panel, comprising a pixel structure comprising:

a plurality of sub-pixels arranged in a matrix, wherein colors of three adjacent ones of the sub-pixels located in a same row are different, and colors of all the sub-pixels located in a same column are same; and data lines and scan lines arranged perpendicularly cross each other, wherein each of the data lines is located between two adjacent columns of the sub-pixels, each of the scan lines is located between two adjacent rows of the sub-pixels, each of the data lines is connected to two or more pixel modules, each of the pixel modules comprises three sub-pixel groups with different colors that are misaligned in an extending direction of the data line, and each of the three sub-pixel groups comprises two same color sub-pixels of the sub-pixels which are arranged adjacent to each other in the same column; wherein the two same color sub-pixels are at a same side of the data line; and a first driving unit electrically connected to the scan lines, wherein the first driving unit inputs scan signals to the scan lines in a preset sequence, the three sub-pixel groups of the pixel modules sequentially obtain the scan signals, and the two same color sub-pixels in a same one of the three sub-pixel groups obtain the scan signals at a same time;

the method comprising:

controlling the first driving unit to input the scan signals to the scan lines in the preset sequence, the three sub-pixel groups of each of the pixel modules sequentially obtaining the scan signals, and enabling the two same color sub-pixels in the same one of the three sub-pixel groups obtain the scan signals at a same time.

16. The method of driving the liquid crystal display panel according to claim 15, wherein the pixel structure has at least one scan period;

the preset sequence comprises, in a scan period, along a sequence of the data line connecting the three sub-pixel groups, the first driving unit first inputting the scan signals to the scan lines connected to the pixel modules, and then inputting the scan signals to the scan lines connected to another one of the pixel modules.

17. The method of driving the liquid crystal display panel according to claim 15, wherein the pixel modules comprise at least a first pixel module and a second pixel module; the three sub-pixel groups are respectively: a first sub-pixel group comprising two first sub-pixels, a second sub-pixel group comprising two second sub-pixels, and a third sub-pixel group comprising two third sub-pixels; the first sub-pixel group, the second sub-pixel group, and the third sub-pixel group are respectively located in adjacent columns; and the data lines are sequentially connected to the first pixel module and the second pixel module.

18. A display device, comprising a backlight source and a liquid crystal display panel, comprising a pixel structure comprising:

a plurality of sub-pixels arranged in a matrix, wherein colors of three adjacent ones of the sub-pixels located in a same row are different, and colors of all the sub-pixels located in a same column are same; and data lines and scan lines arranged perpendicularly cross each other, wherein each of the data lines is located between two adjacent columns of the sub-pixels, each of the scan lines is located between two adjacent rows of the sub-pixels, each of the data lines is connected to two or more pixel modules, each of the pixel modules comprises three sub-pixel groups with different colors that are misaligned in an extending direction of the data line, and each of the three sub-pixel groups comprises two same color sub-pixels of the sub-pixels which are arranged adjacent to each other in the same column; wherein the two same color sub-pixels are at a same side of the data line; and a first driving unit electrically connected to the scan lines, wherein the first driving unit inputs scan signals to the scan lines in a preset sequence, the three sub-pixel groups of the pixel modules sequentially obtain the scan signals, and the two same color sub-pixels in a same one of the three sub-pixel groups obtain the scan signals at a same time;

wherein the backlight source is connected to the liquid crystal display panel and configured to provide backlight for the liquid crystal display panel.

* * * * *